United States Patent [19]

Scott

[11] Patent Number: 5,457,635
[45] Date of Patent: Oct. 10, 1995

[54] PORTABLE APPARATUS FOR DETERMINING CUT POSITIONS IN LOGS

[75] Inventor: Donald A. Scott, Gisborne, New Zealand

[73] Assignee: Interpine Export(NZ) Limited, Kawerau, New Zealand

[21] Appl. No.: 180,418

[22] Filed: Jan. 12, 1994

[30] Foreign Application Priority Data

Jan. 14, 1993 [NZ] New Zealand ............... 245399

[51] Int. Cl.⁶ .................................. G06F 19/00
[52] U.S. Cl. ............... 364/474.13; 83/364; 144/357; 364/474.09; 364/552
[58] Field of Search ............ 364/474.13, 474.09, 364/156, 554, 552, 550, 551.01, 561, 562, 507; 144/356, 357, 359, 363; 33/15; 73/865.8; 356/372–387, 237; 250/559–563, 572; 83/364–370

[56] References Cited

U.S. PATENT DOCUMENTS

| | | | |
|---|---|---|---|
| 3,787,700 | 1/1974 | Chasson | 250/560 |
| 3,852,579 | 12/1974 | Sohn et al. | 235/151.3 |
| 3,890,509 | 6/1975 | Maxey | 250/561 |
| 3,902,539 | 9/1975 | Ketteler | 144/209 A |
| 3,992,615 | 11/1976 | Bennett et al. | 235/151.32 |
| 4,017,976 | 4/1977 | Barr et al. | 33/15 |
| 4,195,346 | 3/1980 | Schröder | 364/475 |
| 4,197,888 | 4/1980 | McGee et al. | 144/209 A |
| 4,221,973 | 9/1980 | Nosler | 250/560 |
| 4,221,974 | 9/1980 | Mueller et al. | 250/563 |
| 4,397,343 | 8/1983 | Fields | 144/209 A |
| 4,534,002 | 8/1985 | Urban | 364/475 |
| 4,546,440 | 10/1985 | Palmberg | 364/475 |
| 4,803,371 | 2/1989 | Durland | 250/560 |
| 4,867,213 | 9/1989 | Bolton et al. | 144/357 |
| 4,947,909 | 8/1990 | Stroud | 144/357 |
| 5,262,956 | 11/1993 | De Leeuw | 364/474.13 |

Primary Examiner—Joseph Ruggiero
Attorney, Agent, or Firm—Jacobson, Price, Holman & Stern

[57] ABSTRACT

A portable tool (41) for determining diameters and lengths along fallen trees (stems). The tool (41) includes callipers (2,3) for measuring diameters at positions along the stem and a tape measure (5) for measuring distance along the stem. In use, spinning lasers (57) are used to set up datum planes (51) either vertically beside the stem or horizontally above the stem. The tool (41) is also provided with a laser sensor (13) so that distance may be determined from the stem to the datum (51) to enable the curvature of the log to be determined. Each of the measuring devices on the tool (41) provide a visual display of their measurements and encoders (9,26) provide an electronic signal representative of the measurements to a computer (19) on the tool (41). Software running on the computer (19) uses these measurements to "paint" a picture of the stem and, using data relating to the value and current desirability of various lengths and qualities of logs, determines the optimum cutting positions along the stem to maximize the value of the logs from the stem.

10 Claims, 3 Drawing Sheets

PORTABLE APPARATUS FOR DETERMINING CUT POSITIONS IN LOGS

This invention relates to apparatus for measuring and analyzing and more particularly but not solely to apparatus for measuring and analyzing log stems in order to optimise log production.

BACKGROUND OF THE INVENTION

It is the aim of most commercial milling operations to maximize the value obtained from felled trees (stems). At present, this function is carried out by experienced forestry workers known as "logmakers" whose job it is to evaluate where each stem should be sawn so that the resulting logs match required market specifications and are produced according to maximum value specifications. More recently, the tools of the logmaker have included a tape measure and sometimes a separate calliper to determine log lengths and diameters. The logmaker marks the stem at appropriate positions so that a saw operator may saw the stems into lengths which have substantially the desired parameters.

A current aid to some logmakers has been the introduction of a computer based optimisation system which is currently used as an audit and/or educational tool. By manually recording information about the quality and profile (length, diameters and curvature) of the stem at selected positions, and then entering this information into a software program, the optimum cutting positions on any stem can be established which are then compared to positions evaluated by the human logmaker. The human logmaker may then be given advice on how to improve his or her skill. At present, the computer executing the optimisation program is usually not readily accessible by the logmaker. In order for the system to be used, measurements must be recorded in the field (usually on paper) and then later entered into the optimization program which is frequently available only on a remote computer. Once the program has determined the cutting positions, by returning to the logging site the human logmaker may be evaluated and given advice. This process is time consuming and laborious.

It is therefore an object of the present invention to provide apparatus for determining cut positions in stems which goes some way towards overcoming the above disadvantages or which will at least provide the industry with a useful choice.

BRIEF SUMMARY OF THE INVENTION

Accordingly the invention consists in apparatus for determining cut positions in stems. The apparatus has distance measuring means which provide an output signal representative of length for determining lengths along a stem. The apparatus also has diameter measuring means which provide an output signal representative of diameter for determining the diameter of a stem at selected points along the stem. Also provided on the apparatus are data entry means to receive and output selected information relating to the quality of a stem at various positions along the stem. Computing means are also provided on the apparatus which in response to input signals from the distance measuring means, diameter measuring means and data entry means, determines the preferred cutting positions on a stem to optimise the millable timber obtained from the stem. Output means are provided to allow information determined by said computer means to be presented to the user.

The invention consists in the foregoing and also envisages constructions of which the following gives examples.

BRIEF DESCRIPTION OF THE DRAWINGS

One preferred form of the present invention will now be described with the reference to the accompanying drawings in which.

DETAILED DESCRIPTION OF THE PREFERRED EMBODIMENT

Figure 1:
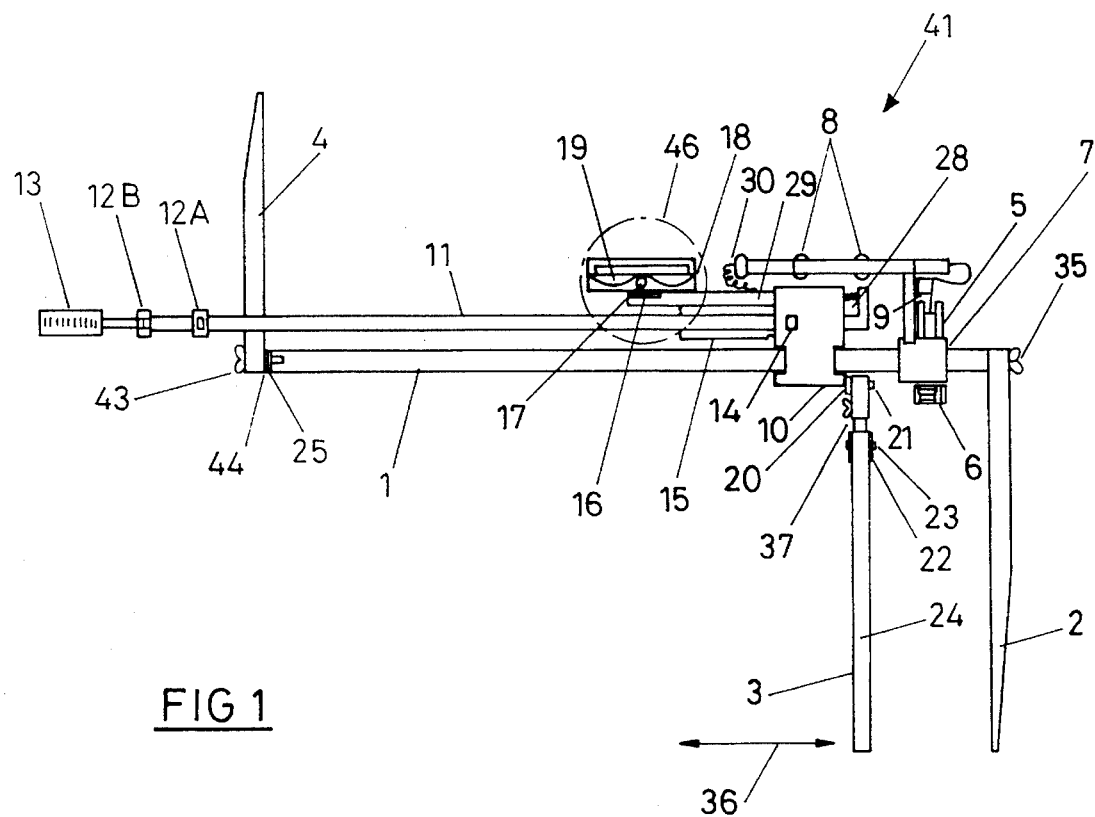
FIG. 1 is a front elevation of the apparatus for measuring and analyzing log stems of the present invention.

With reference to the drawings, FIG. 1 shows apparatus (the "tool") generally referenced 41 which is used for determining optimal log cutting positions on a felled tree (stem). The tool 41 is preferably of a light weight tubular alloy construction. The tool 41 comprises a calliper frame member 1 which is provided with three attached legs being fixed calliper leg 2, sliding calliper leg 3 and rotating calliper leg 4.

Fixed calliper leg 2 is attached to calliper frame member 1 by a wing bolt 35 providing for the removal of the fixed let 2 for service or storage. Sliding calliper leg 3 is attached to calliper frame member 1 by a diametral slide 10. Diametral slide 10 allows calliper leg 3 to move along the length of frame member 1 in the direction indicated by arrow 36 so that the diameter of a stem may be determined by placing calliper legs 2 and 3 on opposite sides of the stem. Calliper leg 3 is attached to diametral slide 10 by a wing bolt 37 to facilitate the removal of calliper leg 3 for service or for storage. Calliper leg 3 is held parallel to calliper leg 2 by a detent 20 and has the ability to rotate around pivot 21 tracing out a half semi-circle which is similar to the upper half of circle 52 in FIG. 3 and may be held in any one of the positions 38, 39 or 40 by detent around pivot 21.

Figure 3:
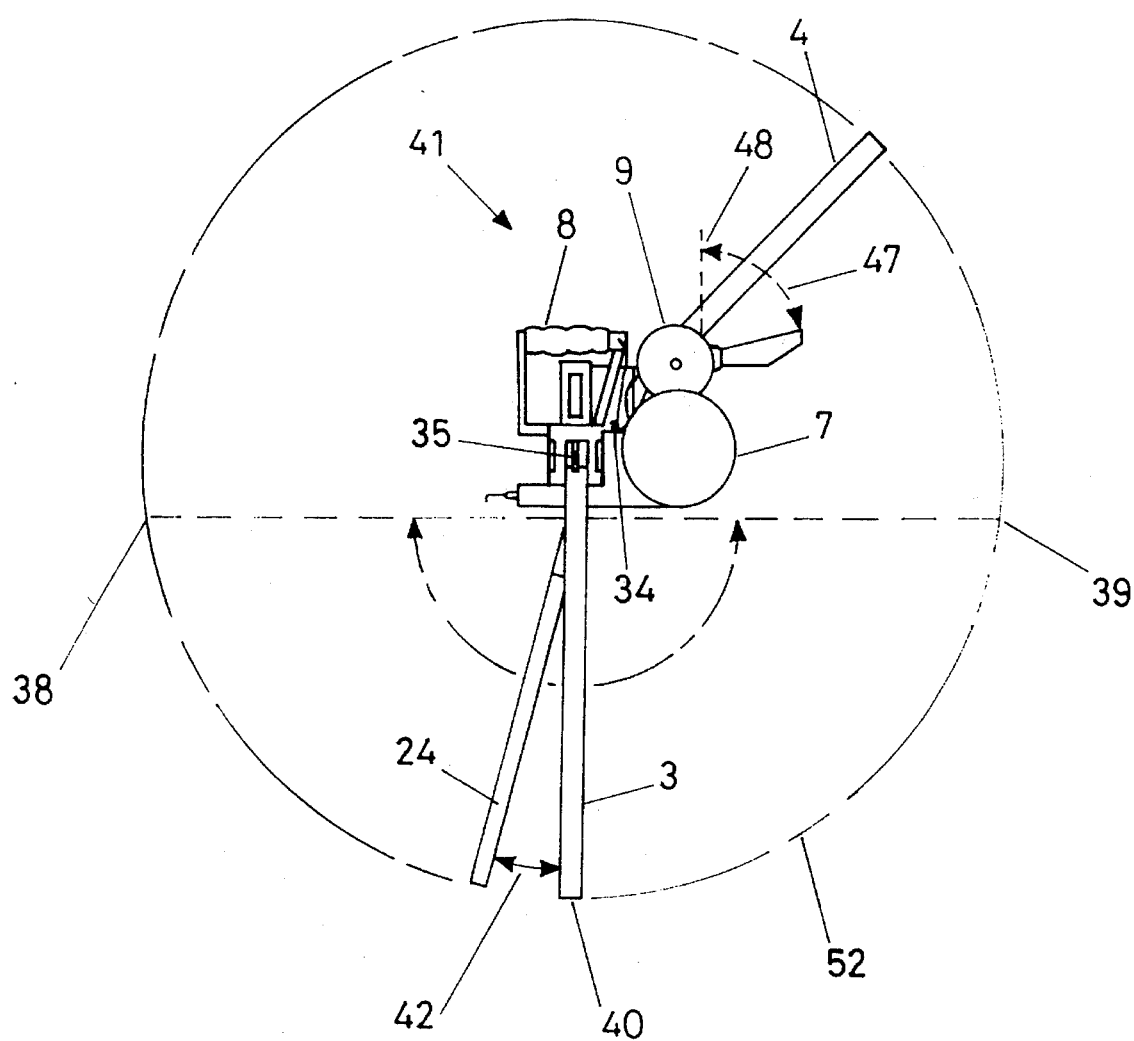
FIG. 3 is an end elevation of the apparatus of FIG. 1.

Calliper leg 3 also includes a stand leg 24 which, in the front elevation of FIG. 1, is directly in front of calliper leg 3. Stand let 24 is pivoted around pivot 23 and held in position by detent 22. The range of movement available to stand leg 24 is shown in FIG. 3 by arrow 42. In the outer position as shown in FIG. 3, stand leg 24 is in the stand position so that the tool may be rested on 2 and 3 (along with leg 4 if it is suitably positioned). Stand leg 24 may be placed in the closed position, flat against the calliper leg, when the stand leg is found to be interfering with the operation of the device.

Rotating calliper leg 4 is attached to calliper frame 1 by a wing bolt 43. Wing bolt 43 allows for the removal of calliper leg 4 for service or storage. Calliper leg 4 is used in some situations to measure out of roundness in stems by pivoting around wing bolt 43 to a similar position to calliper leg 2 and is held rigid by detent 44, allowing a diametral measurement of a stem to be taken between calliper legs 3 and 4 (instead of 2 and 3 as is usual). When not in use calliper leg 4 may be rotated about wing bolt 43 to a position convenient to the operator of the tool and is held in this position through the spring pressure of detent 25 as described by circle 52 in FIG. 3.

Calliper frame 1 has a visual measurement scale on the top side (as viewed in FIG. 2) thereof so that a visual measurement may be made of stem diameter when the stem is positioned between the calliper legs. The diameter is also electronically sensed by an encoder (not shown) which is mounted within diametral slide 10 and has a spiked wheel which engages holes along the underside of calliper frame 1. The encoder is wired to a signal processor 15 providing the signal processor with signals indicative of stem diameter.

A tape carrier 7 is also attached to calliper frame 1. Tape carrier 7 is able to slide along calliper frame 1 in a similar fashion to diametral slide 10 although tape carrier 7 has an operator adjustable resistance to sliding through a spring loaded roller (not shown). Operators handles 8 are rigidly fixed to tape carrier 7 providing convenient means for the operator to grasp the tool. A self retracting tape 5 is installed onto tape carrier 7 for measuring stem length with tape head 6 positioned towards the butt end. Tape 5 has a visual scale and is electronically sensed for length through encoder wheel 25 which is spring loaded to follow the changing diameter of the reel of tape 5. Encoder wheel 25 drives an encoder which is also wired to signal processor 15 providing the signal processor with further signals which are indicative of stem length. Extendable lead 30, which passes through tube 27 connects encoder wheel 25 to the signal processor 15. Tape 5 is attached to tape carrier 7 by a quick release button 34 to allow the tape to be removed, flipped and then relocated with the tape head 6 pointing in the opposite direction depending on operator preference or as dictated by the lie of the stems.

Attached through diametral slide 10 is a telescopic deflection rod 11 which is extendable using telescopic adjusters 12A and 12B. Deflection rod 11 is able to pass through the length of diametral slide 10 to the first telescopic adjuster 12A. Deflection rod 11 is locked in any position along its length by a deflection rod lock 14. A laser sensor 13 is provided at the end of the deflection rod 11. Sensor 13 is made up a number of smaller sensors to provide sensitive edge detection of a laser beam datum (which will be described below) once it has been generally located. The generated signal output of sensor 13 is fed to signal processor 15 through an extendable lead 28 inside the telescopic members to provide the signal processor with signals indicative of the distance between the stem and the datum at various positions along the stem to thereby produce curvature information.

Signal processor 15 is attached to tube 29 which is attached to diametral slide 10. Also mounted to the end of tube 29 is a handle swivel 16 which allows computer handle 31 to rotate through the 180° dotted arc 45 in FIG. 2. Handle 31 may be detented in the position shown in FIG. 2 or alternatively 180° opposite. A waterproof computer 19 is connected by a quick release housing 32 to a computer swivel 17. Quick release housing 32 allows the computer to be removed swiftly form the tool while swivel 17 allows computer 19 to be rotated about dashed arc 46 in FIG. 1. Quick release housing 32 has a rake adjuster 18 which allows the housing 32 and computer 19 to move through arc 48 in FIG. 3 from the computer position shown to that represented by dotted line 48. A communication cord connects the computer input/output port of computer 19, through computer handle 31, to the signal processor 15 so that the computer receives each of the previously mentioned indicative signals.

Computer 19 is loaded with software which takes as inputs the measurements of length, diameter and curvature of the stem (along with timber quality information as will soon be described) and determines the optimum cutting positions to maximize the value obtained by cutting the stem into logs and then timber.

The computer software consists of an optimizing algorithm which works in conjunction with a logtype file. The logtype file contains specifications for each logtype to be considered, along with a relative value representing the desirability of each logtype. The operator uses the tool 41 to "paint" an electronic picture of the stem for the software using the process which is described below. This information allows the algorithm to "fit" the best value combination of logs to the stem thus providing an optimum solution in terms of the value returned by the stem when cut into logs.

To allow stem curvature to be electronically measured, rotating lasers are used to establish datums (as have previously been mentioned) for the stem. The simplest scenario is to assume that the area (where the stems are to be optimised are lying) is flat.

Figure 4:
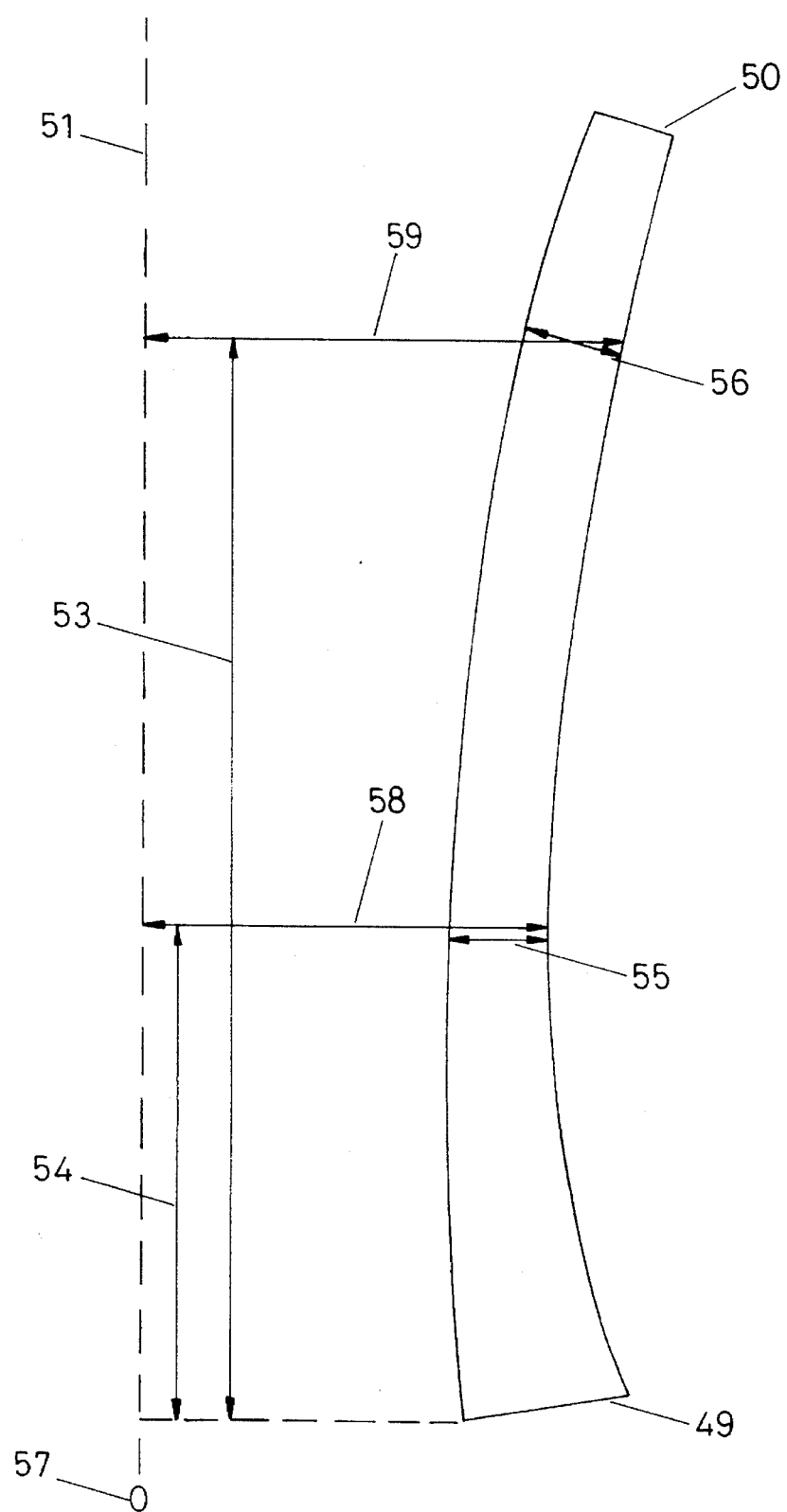
FIG. 4 is a diagrammatic view illustrating the operation of the apparatus of FIG. 1 on a stem.

With reference to FIG. 4, a first horizontally rotating laser (not shown) is set up about 2.4 meters above the ground. This first laser remains in this position throughout the measuring procedure for all of the stems. By setting a height of 2.4 meters the laser beam is assured of being above an operator's head. A second vertically spinning laser 57, on a movable tripod is situated approximately 2 meters out from the average centreline of the stem to be measured. The second laser 48 rotates in a vertical plane indicated by line 51, sighted along a course parallel to the average stem centreline. This second laser must be relocated next to each stem as different stems are processed.

Figure 2:
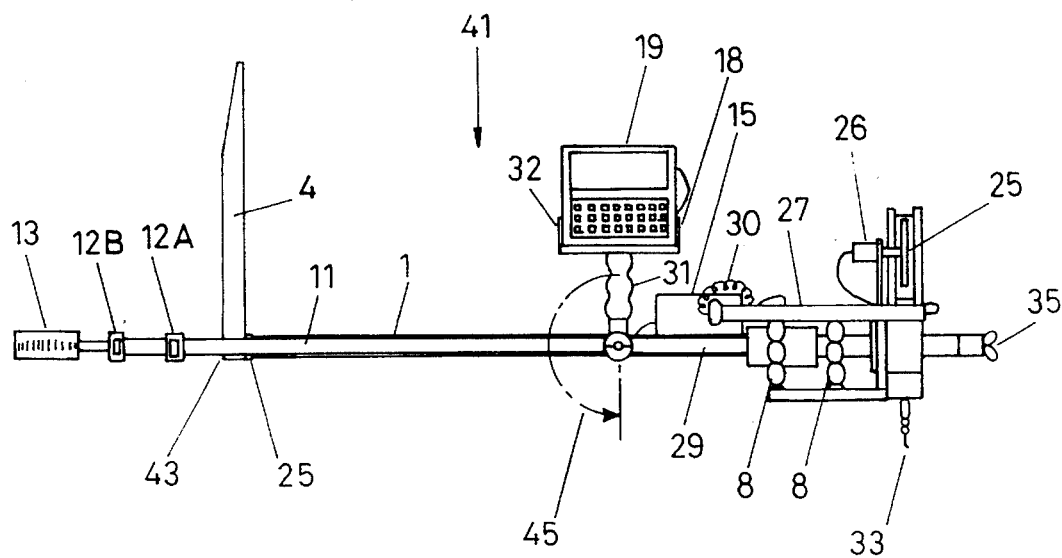
FIG. 2 is a plan elevation of the apparatus of FIG. 1.

The tool 41 has the advantage that it may be configured for use dependent on individual operator requirements. The normal configuration is with the tool configured as shown in FIGS. 1 to 3, with the operator (not shown), in FIG. 1 standing just to the left of calliper leg 3, facing into the page with his or her left hand grasping computer handle 31 and the right hand grasping either of the handles 8 (whichever is more comfortable). The tool 41 is then lifted, allowing the lower ends of calliper legs 2 and 3 to remain closest to the ground. Assuming the operator works from the butt end 49 of the stem, walking forward to the SED 50 (Small End Diameter) he or she will be on the left hand side of the stem with the stem between calliper legs 2 and 3. If the operator wishes to work from the other side of the stem, the tool is reconfigured by rotating the computer handle 31 through arc 45 in FIG. 2 to the opposite detented position. Tape 5 is released from the tape carrier 7 and repositioned (as has previously been described) so that the tape head may be drawn out in the opposite direction. The operator then picks the tool up from the opposite side (that is, from behind the tool as shown in FIG. 1).

After deciding how the tool will be configured for use, the operator moves to the butt 49 of the stem, positioning diametral slide 10 so that the stem can pass between calliper legs 2 and 3. The tape carrier 7 is positioned in a comfortable position approximately in the centre of the stem. Diametral slide 10 is moved relative to tape carrier 7 simply by either pushing or pulling on computer handle 31 and as tape carrier 7 has more resistance to rolling it will not move. To move tape carrier 7 relative to diametral slide 10 the operator's leg is rested against the calliper frame 1 (above the knee) acting as a brake for diametral slide 10 and allowing tape carrier 7 to move. Note that if the rolling resistance in tape carrier 7 is too great or too little then it may be adjusted manually.

The stem butt 49 diameter is measured by allowing calliper leg 2 to rest against the far side of the stem and bringing calliper leg 3 in against the near side. By pressing an appropriate key on the computer keyboard in response to the software, the electronically sensed diameter and length along the log measurements will be downloaded to the computer (the length measurement in this case is 0 mm). These measurements can also be keyed manually from the visual diameter scales, if the electronic sensors were to malfunction. Occasionally a stem may be oval in cross-section and more than one diameter reading must therefore be taken to obtain an average diameter. Any diameter clockwise of horizontal (from the operator's position) is taken between calliper legs 2 and 3 while any anticlockwise diameter is taken by rotating calliper leg 4 down to be in line with legs 2 and 3 (it will detent in this position), and measuring between legs 3 and 4. It is probable that deflection rod 11 will have to be in its telescopically retracted position and readjusted through diametral slide 10 to allow this measurement to be made without interference.

The tape spike 33 of tape 5 is now placed at the butt end 49 of the stem and the operator proceeds towards the SED 50 of the stem carrying the tool 41. As the operator proceeds, he describes the characteristics of the stem by inputting quality codes into the computer (as requested by the software) and the lengths (either electronically or manually), for example 53 and 54, that define their boundaries (quality codes are alphabetic references to different stem characteristics such as the number of knots). Diameter readings (with their length reference), for example 55 and 56, are input at various positions along the stem at the operator's discretion to allow the software to calculate intermediate diameters, tapers and volumes for each stem. At intervals of around 10 m, staples shaped spikes are pressed into the stem to keep the tape on top of the stem.

Where a horizontal curvature reference for the stem is required calliper leg 2 is moved to its diametral measuring position, then the operator's left hand traverses diametral slide 10 along calliper frame 1 to the position where the laser sensor 13 is heard to beep, indicating that the sensor has intersected the plane 51 traced out by vertically spinning laser 48. The signal processor 15 locates the beam edges within sensor 13 and by pressing the appropriate computer key the operator causes the distance from the inside of calliper leg 2 to the laser datum 51 to be recorded for example 58 and 59. By obtaining a number of these measurements along the stem, the stem curvature or deflection may be plotted by the software. If calliper leg 3 is found to obstruct the operator in obtaining these measurements then it can be rotated to positions 38 or 39 in FIG. 3. For a vertical curvature reference the tool is rotated clockwise until deflection rod 11 is vertical and the outer edge of calliper leg 2 is on top of the log. By rearranging computer 19 through computer swivel 17 and rake adjuster 18, the operator can view the screen and access the appropriate key on the keyboard. Diametral slide 10 is then traversed along calliper frame 1 (vertically) until the plane traced by the horizontal laser is intersected by sensor 13, allowing a measurement to this datum to be taken and recorded by the software.

When the end of the stem is reached, the final tape reading is required by the software to be entered manually. This provides an accurate method of correcting for, for example, slippage of the tape along the stem. Any difference in electronic and manual input is scaled to the manually entered length by the software. The stem is optimised through the software and the cutting solution is displayed. This includes tape readings to allow the operator to mark the stem appropriately, and the log type. The operator then walks to the other side of the tool, reverses computer handle 31 to its opposite position (away from him) and walks back along the log, carrying the tool. As the operator returns to the butt end 49 of the stem the tape retracts into its housing allowing the operator to locate the appropriate log measurements along the stem and mark them out on the stem with, for example, a can of spray paint. The staple shaped spikes, guiding the tape to the top of the log are removed as they are encountered.

To mark the log ends the operator reaches the appropriate position, as indicated by the static computer display, and resting the tool on its two calliper legs (they straddle the log), leans it back against himself so that both hands may be used. The tape 5 is tightened, to ensure accuracy, with the left hand, leaving the right hand free to mark the log with a paint spray or similar.

Stored information from the computer is available for inventory "what if analysis" and other use. It can be made immediately available to management systems away from the logging site through data communication equipment such as radio telephone modems.

It has been found that the present invention allows the operator to greatly increase the quality and value of logs produced from stems, as well as creating a database of each logging site. The present invention has the advantage that it is a completely portable, hand held unit which is easy to operate, robust and easily produced. The construction of the tool is designed with the operator in mind so that weight is kept to a minimum to limit operator fatigue. Stems can be measured even when spacing between adjacent logs is minimal. With a little experience it is expected that an operator will be able to complete the marking of a stem in little more time than taken by previous methods while there will be obvious improvements in the monetary return obtained.

We claim:

1. Portable apparatus for maximizing the value of logs cut from stems which determines cut positions in said stems comprising:

distance measuring means which provide an output signal representative of length for determining lengths along a stem, diameter measuring means which provide an output signal representative of diameter for determining the diameter of a stem at selected points along the stem, data entry means to receive and output selected information relating to the quality of a stem at various positions along the stem, computing means which, in response to input signals from said distance measuring means, said diameter measuring means and said data entry means, determine the preferred cutting positions on a stem to optimise the usable wood obtained from the stem, and output means to allow information determined by said computer means to be presented to the use.

2. Portable apparatus for maximizing the value of logs cut from stems as claimed in claim 1 which also includes curvature measuring means which provide an output signal indicative of the distance between the stem and a datum at various points along the stem, for determining the curvature of the stem.

3. Portable apparatus for maximizing the value of logs cut from stems as claimed in claim 1 wherein said distance measuring means comprise a tape measure with first distance sensing means to encode the distance of extension of said tape measure to produce said output signal indicative of length.

4. Portable apparatus for maximizing the value of logs cut from stems as claimed in claim 1 wherein said diameter measuring means comprise a calliper, having first and second legs, with second distance sensing means which encode the distance between said first and second legs to produce said output signal representative of diameter.

5. Portable apparatus for maximizing the value of logs cut from stems as claimed in claim 2 wherein said curvature measuring means comprise third distance sensing means to encode the distance between said stem and said datum to provide said output signal indicative of distance between said stem and said datum to determine curvature of said stem.

6. Portable apparatus for maximizing the value of logs cut from stems as claimed in claim 1 wherein said computing means comprise:

first storage means containing values and attributes of logs so that analysis may be carried out to determine said preferred cutting positions which will optimise the value of the logs which will be extracted from the stem, and second storage means to store said information obtained from said input signals for each stem along with said preferred cutting positions.

7. Portable apparatus for maximizing the value of logs cut from stems as claimed in claim 5 wherein said third distance sensing means comprise an extendable laser sensing means which encodes the distance of extension of said laser sensing means to produce said output signal representative of the distance between the stem and said datum at various points along the stem for determining the curvature of the stem in the horizontal plane.

8. Portable apparatus for maximizing the value of logs cut from stems as claimed in claim 5 wherein said datum is provided by a horizontally spinning laser arranged to provide a horizontal planar datum and wherein said third distance sensing means comprise an extendable laser sensing means which encode the distance of extension of said laser sensing means to produce said output signal representative of the distance between the stem and said datum at various points along the stem for determining the curvature of the stem in the vertical plane.

9. Portable apparatus for maximizing the value of logs cut from stems as claimed in claim 1 wherein said apparatus include communications means to enable said computer means to transmit and/or receive data to or from a remotely located storage and processing means.

10. A portable apparatus for maximizing the value of logs cut from stems as claimed in claim 5 wherein said third distance sensing means is also utilized by said diameter measuring means to determine and output said signal indicative of diameter.

* * * * *